J. R. ARMSTRONG.
NUT LOCK.
APPLICATION FILED MAY 14, 1910.

975,011.

Patented Nov. 8, 1910.

2 SHEETS—SHEET 1.

Witnesses:
Fred K. M. Dannenfelser
Chas. P. Beard

Inventor
J. R. ARMSTRONG

THE NORRIS PETERS CO., WASHINGTON, D. C.

J. R. ARMSTRONG.
NUT LOCK.
APPLICATION FILED MAY 14, 1910.
975,011.
Patented Nov. 8, 1910.
2 SHEETS—SHEET 2.
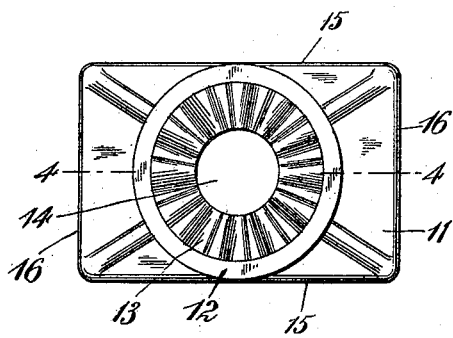
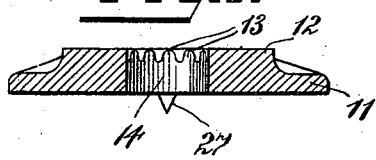
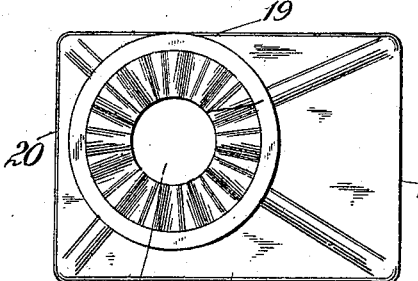
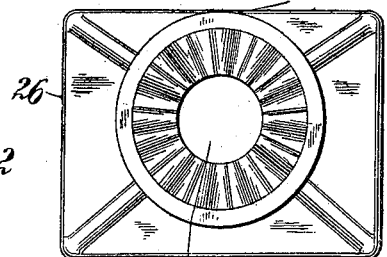
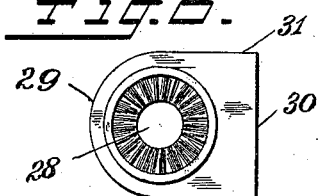
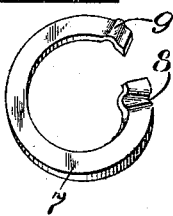
Witnesses:
Fred H. M. Dannenfelser.
Chas. P.
Inventor
J. R. ARMSTRONG
By his Attorneys

UNITED STATES PATENT OFFICE.

JOHN R. ARMSTRONG, OF PROVIDENCE, RHODE ISLAND, ASSIGNOR TO THE O. K. NUT LOCK COMPANY, OF PROVIDENCE, RHODE ISLAND, A CORPORATION OF RHODE ISLAND.

NUT-LOCK.

975,011.  Specification of Letters Patent.  Patented Nov. 8, 1910.

Application filed May 14, 1910. Serial No. 561,309.

*To all whom it may concern:*

Be it known that I, JOHN R. ARMSTRONG, a citizen of the United States, residing at Providence, county of Providence, State of Rhode Island, have invented certain new and useful Improvements in Nut-Locks, of which the following is a full, clear, and exact description.

My invention relates to nut locks, and is particularly concerned with an improved form of washer to be employed with such devices, which by its configuration will be held stationary when the nut is turned up.

The main object sought by this invention is to provide a washer having a bore to receive the bolt, so positioned with respect to the perimeter of the washer that said washer will have a plurality of stops arranged at different distances from the bore and adapted to engage abutting surfaces at correspondingly different distances from the bore for the bolt, on the member to be clamped.

With this object in view, the invention consists in the construction and arrangement of parts, a preferred embodiment of which is illustrated in the accompanying drawings, in which—

Figure 1:
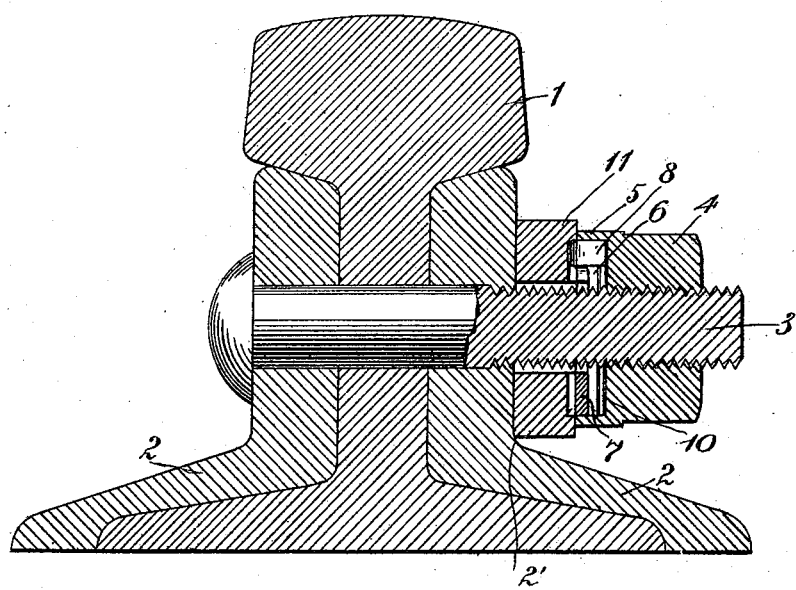
Figure 2:
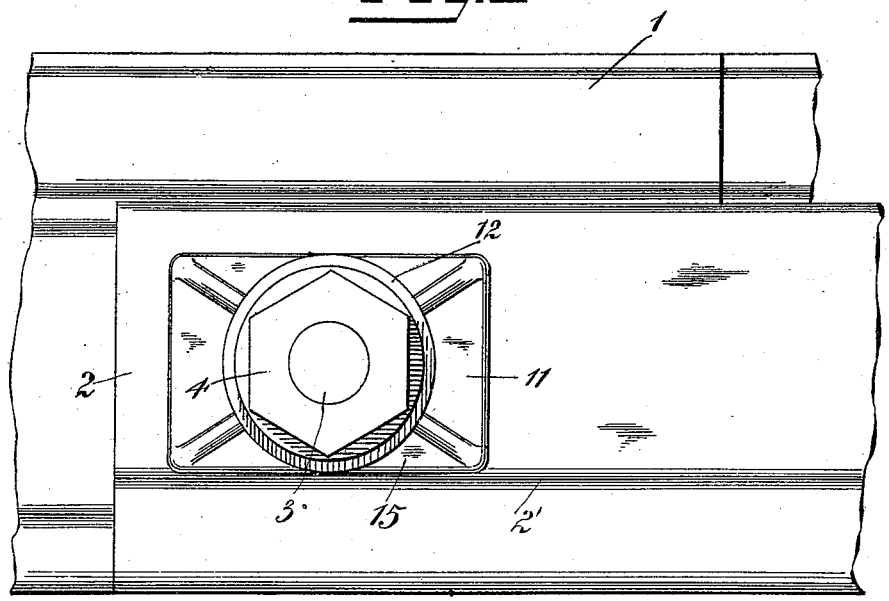

Figure 1 is a vertical sectional view of a railway rail and the fish plates therefor, showing my invention in conjunction therewith. Fig. 2 is a side elevation of the parts shown in Fig. 1. Fig. 3 is a face view of one form of washer embodying the invention. Fig. 4 is a transverse sectional view thereof on the line 4—4 Fig. 3. Fig. 5 shows a modified form of washer. Fig. 6 shows a further modification. Fig. 7 is a view of one form of split ring employed in the nut lock. Fig. 8 shows a further modification.

In the embodiment of my invention illustrated in Figs. 1 and 2, 1 indicates a railway rail having the usual fish plates 2—2 upon either side thereof spanning the joint between the ends of adjacent rails, as usual.

3 indicates a bolt passing through the fish plates and web of the rail.

4 indicates a lock nut having a depending flange 5 forming a recess 6, in which is contained a resilient split ring 7 having projections 8 and 9 on the opposite ends respectively, one projecting to one side of the split ring and the other to the other. The bottom of the recess 6 of the nut is provided with corrugations 10 to engage one of the projections of the split ring.

11 indicates a washer having preferably a raised portion 12, Figs. 3 and 4, provided with a series of radial corrugations 13 surrounding the bore 14 of the washer. The projections of the split ring opposite that engaging the nut engage these corrugations when the nut is turned up, whereby the nut is held against accidental loosening by the spring engagement of the projections of the split ring with the corrugations on the nut and washer respectively.

The washer, shown in Figs. 3 and 4, is of rectangular outline, with the opposite sides 15—15 arranged at a shorter distance from the bore 14 than are the sides 16—16. As shown in Figs. 1 and 2, one of the sides 15 engages the angle 2' of the fish plate, said angle forming an abutting surface whereby the washer is prevented from rotation when the nut is either turned up or unscrewed. Should the bore in the member to be clamped, such as the fish plate, however, be located at a different distance from the corresponding abutting wall or surface, the washer may be turned to bring one of the other sides, for example, one of the sides 16 adjacent such abutment. While I have shown the washer as rectangular in outline, it is obvious that such outliine may be varied to provide for a greater number of perimetrical holding edges arranged at different distances from the bore of the washer to provide for a greater number of changes in the relative position of the bolt receiving bore and the abutting wall of the member to be clamped.

In Fig. 5 is illustrated a form of washer 17 capable of a greater number of holding positions, by reason of the position of the bore 18 with respect to the several sides 19, 20, 21 and 22 respectively, of the washer, said sides being located progressively at greater distances from the bore 18 of the washer. This washer provides for four changes of position.

In Fig. 6 a still further modification is illustrated, in which the bore 23 is located at different distances from the opposite sides 24 and 25 respectively, and equidistant from the opposite sides 26—26, thus providing for three changes in position of the washer.

In Fig. 8 a still further modification is illustrated in which the perimeter of the washer at one side of the bore 28 is curved at 29 concentrically with the bore and the opposite side 30 forms the usual stop surface although it is evident the edges 31—31 may also be so used.

In case it is desired to employ this washer in conjunction with a wood surface the under side of the washer may be provided with a holding tang 27.

While I have herein described a particular embodiment of my invention, the same may be varied in detail and relative arrangement of parts within the scope of the appended claims.

What I claim is:

1. In a nut lock, the combination with a nut and a washer, of locking means interposed between said parts, said washer having a plurality of stop edges at its perimeter, and a bolt-receiving bore arranged at different distances from said edges respectively.

2. In a nut lock, the combination with a nut and a washer therefor, of locking means interposed between said parts, said washer having a plurality of stop edges at its perimeter, each arranged at an angle to the adjacent edge, and a bolt-receiving bore arranged at different distances from said edges respectively.

3. In a nut lock, the combination with a nut and a washer therefor, of locking means interposed between said parts, said washer being of substantially rectangular perimeter and having a bolt-receiving bore arranged at different distances from the sides of said perimeter.

4. In a nut lock, the combination with a nut and a washer therefor, of locking means interposed between said parts, said washer having a substantially rectangular perimeter and having a bolt-receiving bore arranged at different distances from adjacent sides of said perimeter.

5. In a nut lock, the combination with a nut and a washer therefor, of locking means interposed between said parts, said washer having a substantially rectangular perimeter and having a bore equidistant from opposite sides of said perimeter and at different distances from the adjacent sides of said perimeter.

6. As an article of manufacture, a washer having a perimeter presenting a plurality of stop edges, and a bolt-receiving bore arranged at different distances from said edges respectively.

7. As an article of manufacture, a washer having a substantially rectangular perimeter, and a bolt-receiving bore located equidistant from opposite sides of the perimeter and at different distances respectively from adjacent sides thereof.

JOHN R. ARMSTRONG.

Witnesses:
CHAS. A. PEARD,
R. C. POWELL.